(12) United States Patent
Arlaud et al.

(10) Patent No.: US 11,518,006 B2
(45) Date of Patent: Dec. 6, 2022

(54) SAFETY SCREW ASSEMBLY AND OPERATING KEY THEREOF

(71) Applicant: CONCEPTS ET INNOVATIONS EN SECURITE MAGNETIQUE, Clermont-Ferrand (FR)

(72) Inventors: Jean-Noel Arlaud, Vic le Comte (FR); Fabien Chabanne, Chanonat (FR); Sebastien Rousset, Aubiere (FR)

( * ) Notice: Subject to any disclaimer, the term of this patent is extended or adjusted under 35 U.S.C. 154(b) by 722 days.

(21) Appl. No.: 16/489,518

(22) PCT Filed: Mar. 1, 2018

(86) PCT No.: PCT/FR2018/050479
§ 371 (c)(1),
(2) Date: Aug. 28, 2019

(87) PCT Pub. No.: WO2018/162821
PCT Pub. Date: Sep. 13, 2018

(65) Prior Publication Data
US 2019/0381636 A1 Dec. 19, 2019

(30) Foreign Application Priority Data
Mar. 9, 2017 (FR) ...................................... 1751936

(51) Int. Cl.
*F16M 13/00* (2006.01)
*B25B 13/48* (2006.01)
*F16B 23/00* (2006.01)
*F16B 41/00* (2006.01)
*F16B 1/00* (2006.01)

(52) U.S. Cl.
CPC ............ *B25B 13/485* (2013.01); *F16B 23/00* (2013.01); *F16B 41/005* (2013.01); *F16B 2001/0035* (2013.01)

(58) Field of Classification Search
CPC ....... B25B 13/485; F16B 23/00; F16B 41/005
See application file for complete search history.

(56) References Cited

U.S. PATENT DOCUMENTS

| 6,024,522 A * | 2/2000 | Bainbridge | F16B 37/14 411/429 |
| 11,166,505 B2 * | 11/2021 | Gonzalez | A41F 3/02 |
| 2002/0029596 A1 * | 3/2002 | Tallarico | B25B 13/485 70/276 |
| 2005/0129486 A1 * | 6/2005 | Totsu | F16B 23/0023 411/402 |

(Continued)

*Primary Examiner* — Amy J. Sterling

(57) ABSTRACT

This invention relates to a safety screw assembly and operating key. The head of the screw is movable between a position where it is rotationally integral with the body and a position where it is freely rotatable. The head of the screw has on one face, an opening or a relief, that matches a relief or an imprint formed on part of the operating key. One end of the body of the screw has a stator and a rotor. The head of the screw forms a housing for receiving the rotor, and the assembly forms a translationally movable securing component which is movable between a loose position, where the head is freely rotatable and the rotor and the stator are rotationally integral, and a locked position, where the head and the stator are rotationally integral, where the key has at least one component for setting the rotor into rotation.

10 Claims, 6 Drawing Sheets

(56) References Cited

U.S. PATENT DOCUMENTS

| | | | |
|---|---|---|---|
| 2005/0204875 A1* | 9/2005 | Schluter | B25B 13/485 |
| | | | 81/436 |
| 2016/0160529 A1* | 6/2016 | Carnevali | F16B 41/005 |
| | | | 70/344 |
| 2017/0067499 A1* | 3/2017 | Schechter | F16B 23/0061 |
| 2021/0331516 A1* | 10/2021 | Blanco Barrera | B60B 7/16 |

* cited by examiner

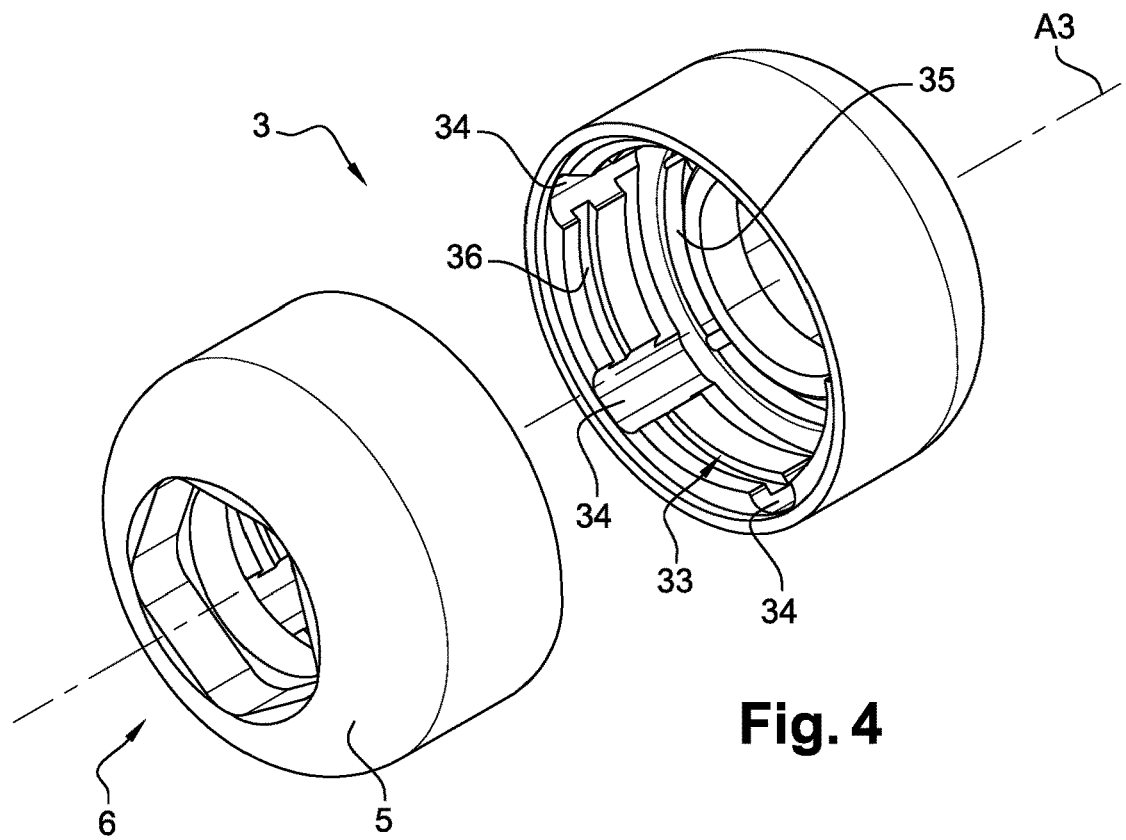
Fig. 4
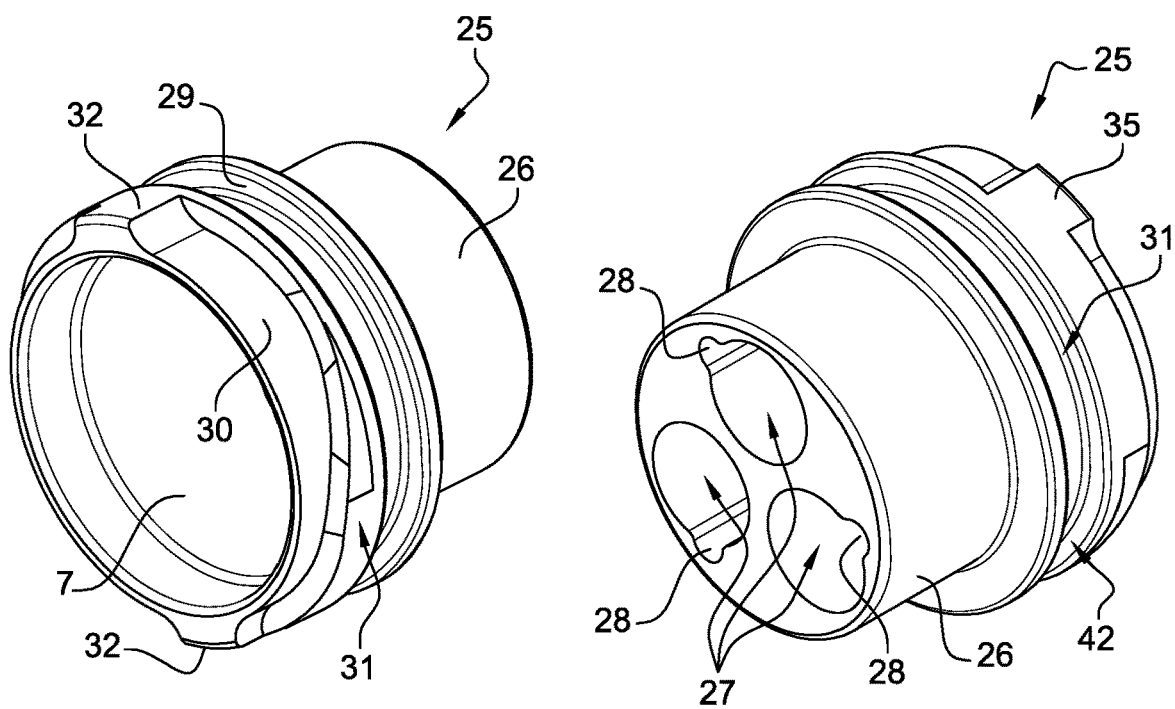
Fig. 5   Fig. 6

SAFETY SCREW ASSEMBLY AND OPERATING KEY THEREOF

CROSS-REFERENCE TO RELATED APPLICATIONS

This application claims priority to international patent application no. PCT/FR2018/050479, filed on Mar. 1, 2018, which is herein incorporated by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

This invention relates to a safety screw assembly and operating key thereof.

The term screw here refers to a component mechanically linking at least two elements. This screw, made of metal or another rigid material, is generally elongated and, over at least a part of its length, has a thread and, at one end, a part called the head that enables the screw to be operated. This screw is adapted to operate in conjunction with an internal thread that matches its thread when a screw is inserted by screwing, thus by a combined rotational and translational movement, into the threaded housing that matches its shape.

The operation of this screw is performed by a screwdriver or key tool, one end of which matches the shape of an imprint formed on the screw head.

Although the use of screws makes it possible to establish links between at least two elements, the fact remains that this link is reversible. This is because the tool for screwing the screw into its threaded housing also enables the screw to be removed from the threaded housing by a rotational movement in the opposite direction.

This characteristic is, in many cases, desirable in order to facilitate the maintenance or dismantling of elements. However, in some cases, it is desirable that the ability to screw and/or unscrew is limited to certain users. The reasons for this restriction are generally protection and/or safety requirements, either for the user or for the equipment on which the screw is located, or both.

By way of non-exhaustive examples, mention may be made of locking screws for a vehicle wheel, screws holding a connection cover between two machine-tool elements in a closed or open position, screws closing a cover or an access door to a given area, whether this area is a volume accessible to living beings, humans or animals, or is an interior volume of an object in the broad sense. In these cases, it should generally only be possible to remove and/or insert the screw if this action is performed by an authorized person.

To meet this constraint, safety or antitheft nuts or bolts are known. These are bolts or nuts whose head has an imprint, in positive or negative relief, with a special geometrical shape, requiring a special tool with a matching shaped imprint to operate this nut or bolt. FR-A-2 728 318 presents this type of bolt. Also known from WO-A-2012 040 800 are safety bolts, where any attempt to unscrew causes part of the head to break, this part then becoming freely rotatable and preventing any transmission of rotational movement, whether for screwing or unscrewing, to the entire bolt. Also known from WO-A-2012 148 050 or WO-A-2005 012 737 are cap-type protection devices, positioned on the screw head, which prevent the nut from being loosened and/or stolen.

Although these various solutions are generally satisfactory as a means of limiting the theft of an object or to avoid unauthorized unscrewing, they nevertheless have certain disadvantages. This is because the number of technically possible geometric shapes for the screw head imprint is relatively limited and it is easy to obtain a tool that fits these imprints.

As a result, anyone with a suitable tool can operate the screw or bolt concerned, especially when these screws or bolts are used to secure the mounting of vehicle wheels. This is because it is easy to obtain a specific tool from the usual suppliers in the automotive or car repair sector.

Moreover, for some of the solutions presented by the documents cited, this implies a final implementation and single use of the securing means. In other words, once the safety configuration has been set, the screw is no longer removable, or at least not easily.

Also known from US-A-20021029596 is a safety screw with a dedicated key enabling the screw to be locked or the screw head to be set into free rotation. For this, the key enables a magnetic component to be moved that can only be translationally moved. Here, the key itself is not secured.

Under these conditions, the invention aims to provide a safety screw assembly and operating key thereof, which is easy to use and suitable for the quick insertion and removal of the screw, without this operation being possible by an unauthorized person.

BRIEF SUMMARY OF THE INVENTION

For this purpose, the subject of the invention is a safety screw assembly and operating key thereof comprising said screw formed of a body and a head, the head being movable between a first position where it is rotationally integral with the body and a second position where it is freely rotatable, the head having, on one face, an opening or a relief, the shape of which matches a relief or an imprint formed on part of said operating key, characterized in that an end of the body of the screw comprises a first part called the stator, and a second rotationally movable part, called the rotor, the head of the screw defining a housing element for receiving the rotor, and in that the assembly comprises a translationally movable securing component, said component being movable between a first securing position, called the loose position, in which the head is freely rotatable, and the rotor and the stator are rotationally integral, and a second position, called the locked position, in which at least the head and the stator are rotationally integral, and in that the key has at least one component for setting the rotor into rotation.

In this way, it is possible, by rotating the key, to set the rotor into rotation and, as a result, to secure or rotationally disengage the head and the body of the screw by a translational movement of the securing component. This rotation of the rotor is, advantageously, obtained by a mechanical and magnetic link between the key and the rotor. For this, magnets are inserted into the key and rotor. If a single magnet is used, the latter may, alternatively, consist of several magnetized segments of different polarities or, if several magnets of different polarities are used, it is conceivable that the rotor and the key can only be magnetically linked, and therefore rotationally secure, for a specified key/rotor torque. Thus, tightening or loosening of the screw is secured and only an authorized person with the appropriate key can use the screw. Furthermore. the fact that magnetic means are used prevents any attempt to forcibly establish a link between the head and the rotor by the known means of picking a lock.

Depending on the advantageous but non-obligatory aspects of the invention, this assembly may comprise one or more of the following characteristics:

The stator comprises two cylindrical parts with a circular base, the smaller-diameter part having a bottom with at least two wells forming housing elements to receive pistons that are translationally movable in a direction parallel to the longitudinal axis of the body.

The rotor comprises two parts whose shape matches the parts of the stator, the smaller-diameter part comprising at least two wells forming housing elements to receive the magnets housed in the rotor.

The wall of the larger-diameter part of the rotor has a helical incline terminated by two stops.

The securing component is a flat ring fitted with at least one tab extending outwards and coplanar to the solid part of the ring.

The securing component is said flat ring fitted with five tabs extending outwards and coplanar to the solid part of the ring.

The ring comprises two reliefs extending towards the inner aperture of the ring, coplanar with the solid part of the ring adapted to operate in conjunction with the stops of the slope when the ring is in position on the larger-diameter part of the rotor.

The inner face of the head has an annular groove adapted to receive the tab(s) of the ring when the head is in a freely rotatable configuration.

The inner face of the head has at least one longitudinal groove, one end of which opens onto the annular groove, and is adapted to receive at least one tab of the ring when the head is rotationally integral with the rotor.

The inner face of the head has five longitudinal grooves, one end of which opens onto the annular groove, and is adapted to receive the five tabs of the ring when the head is rotationally integral with the body of the screw.

The operating key comprises said component for setting the rotor into rotation, of which there is at least one, fitted with at least one magnet whose polarity matches the magnet, of which there is at least one, housed in the rotor.

BRIEF DESCRIPTION OF THE SEVERAL VIEWS OF THE DRAWING

The invention will be better understood and its other advantages will appear more clearly on reading the following description, given solely as a non-exhaustive example of various embodiments of the invention and made with reference to the accompanying diagrams in which:

FIG. 4 represents two perspective views, on the same scale as FIG. 1, of the head of the screw in two opposite directions.

FIGS. 5 and 6 are two perspective views, on a larger scale than FIG. 1, of the rotor in two opposite directions.

DETAILED DESCRIPTION OF THE INVENTION

Figure 1:
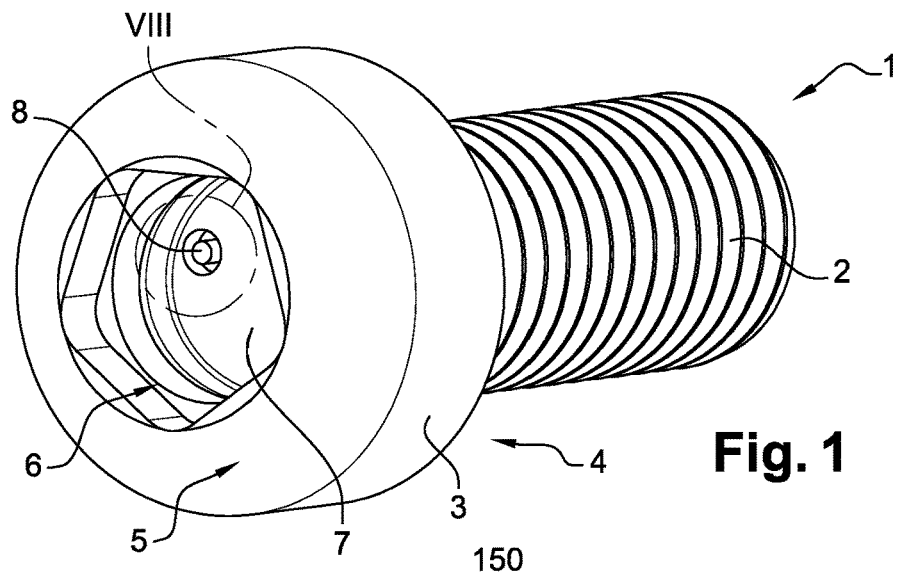
FIG. 1 is a perspective view of a screw of an assembly according to one embodiment of the invention.

FIG. 1 shows a screw 1 belonging to a screw assembly and key according to one embodiment of the invention. The screw 1 comprises a cylindrical body with a circular and threaded base 2. The length, diameter and thread pitch of the body 2 are preferably chosen from standardized screw data. Alternatively, this data is specific and adapted to how the screw 1 is used.

A cylindrical screw head 3 with a circular base is fitted to one end 4 of the body 2. The end 4 is a component of the stator of the screw 1. The outer face 5 of head 3 has a through opening 6. Here, the opening 6 is pentagonal with straight walls. Alternatively, it can be in another form that is not shown: for example, hexagonal or octagonal with curved walls.

A bottom 7 blocks part of the opening 6, as can be seen in FIG. 1. The bottom 7 is independent of the head 3. It consists of a rotor 25. The bottom 7 is flat and made of a material permeable to magnetic waves. In this case it is made of metal.

Figure 8:
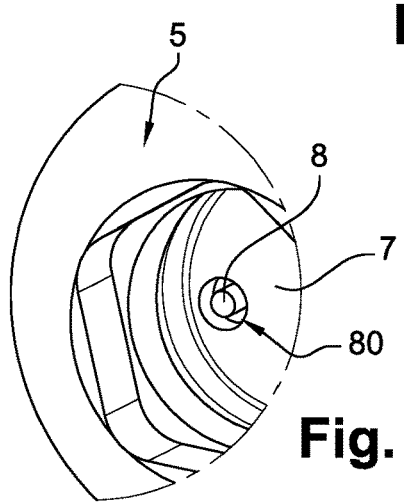
FIG. 8 is a partial perspective view, on a larger scale, of detail VIII in FIG. 1.

A lug 8 is fixed perpendicularly to the bottom 7, in the vicinity of the periphery thereof. As is apparent from FIG. 8, the lug 8 is cylindrically shaped and is positioned in the center of a hole 80, so that its top is coplanar with the bottom 7. In another embodiment, the bottom 7 has more than one lug and/or of different shapes. For example, one or two lugs 8 extend perpendicularly from the bottom 7.

Figure 2:
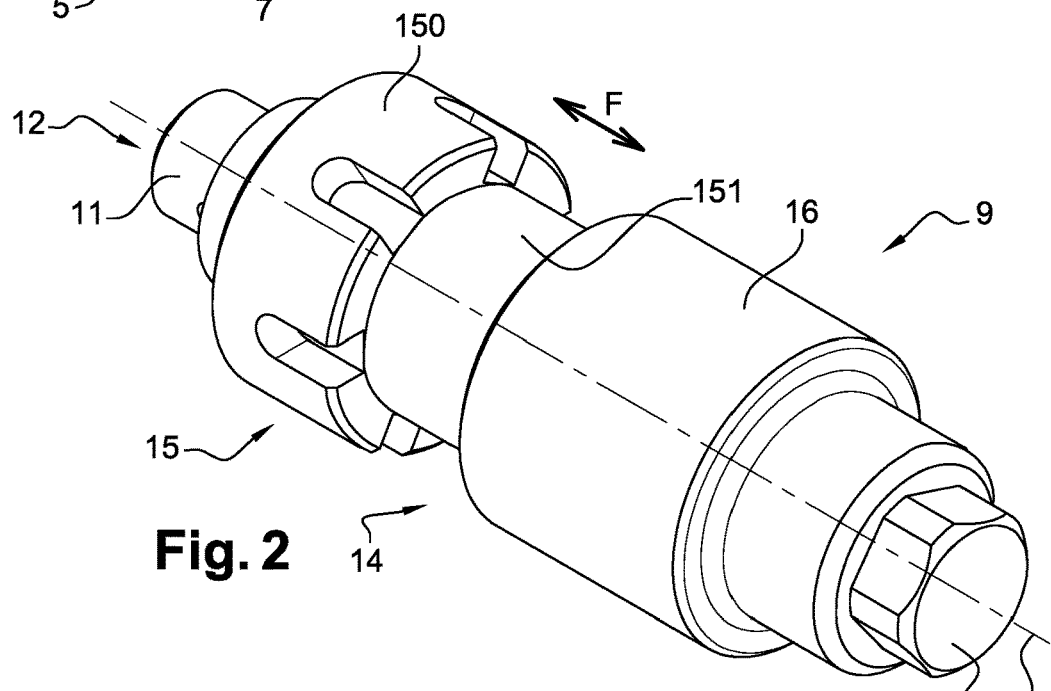
FIG. 2 is a perspective view, on a smaller scale, of a key of the assembly to which the screw of FIG. 1 belongs.

FIG. 2 shows an operating key 9 according to one embodiment. The shape of key 9 is cylindrical. Advantageously, it is made of a non-corrosive metal, for example stainless steel. Alternatively, it is made of polymers or of a composite metal- and polymer-based material.

One end of the key 9 is formed by a relief 10, whose shape matches that of the opening 6 of the head 3. Here, the relief 10 is pentagonal. Once inserted into the opening 6, the dimensions of the relief 10 make it possible, by rotating the key 9 around its longitudinal axis A9, to turn the head 3 of the screw in one direction or the other, as per the double arrow F9. In other words, the relief 10 makes it possible for the screw 1 to be tightened or loosened. The key 9 makes it possible to tighten it with a given, specific tightening torque for each screw assembly and key, as needed.

The opposite end of the key 9 with the relief 10 is formed by the relief 11, with a cylindrical circular base and a flat and circular top. The dimensions of the relief 11 enable the relief 11 to be inserted into the opening 6, but without the rotation of the relief 11 causing the head 3 to rotate.

Figure 9:
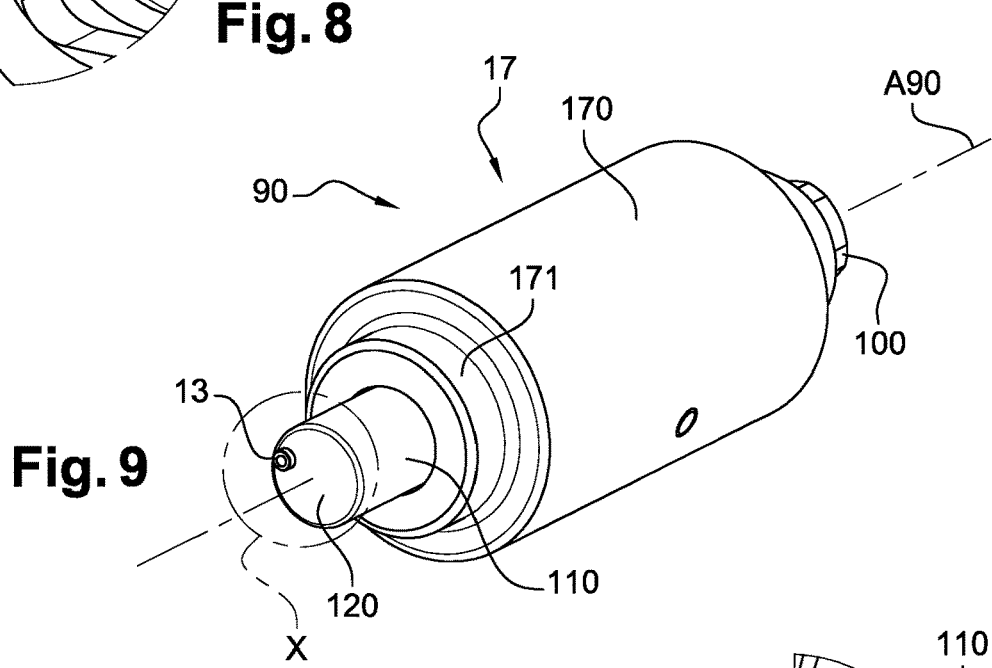
FIG. 9 is a perspective view, on a different scale, of a key of an assembly according to another embodiment of the invention.
Figure 10:
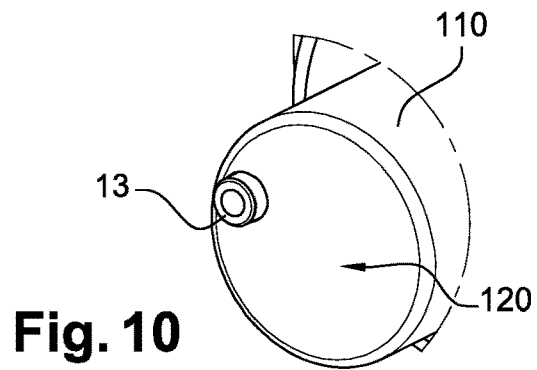
FIG. 10 is a partial perspective view of detail X.

FIG. 9 shows another embodiment of an operating key 90 in compliance with the invention. The key 90 is also cylindrical. The functionally identical elements between the keys 9; 90 have the same references, multiplied by a factor of ten. The end relief 100 of the key 90 is therefore identical to the end relief 10 of the key 9. The relief 110 of the key 90 is identical to the relief 11 of the key 9.

As is apparent from FIG. 9, the top 120 of the relief 110 is flat and circular. It has a hollow relief 13 whose shape matches that of the lug 8 and the well 80 located on the bottom 7. The top 12 of the relief 11 is similar to the top 120 of the relief 110. It also has a hollow relief, similar to the relief 13 and not visible in the various figures.

It is conceivable that during insertion of the relief 11 or 110 into the opening 6, there is complementarity of shape between the lug 8, the well 80 and the relief 13 so as to angularly position the relief 11 or 110 in the opening 6 and on the bottom 7.

At least one cylindrical magnet is therefore housed inside the relief 11; 110, behind the flat metal top 12; 120. This magnet may be monopole or multipolar. Depending on the complexity of the desired coding, several magnets, preferably multipolar magnets, will be used. In this case, according to an advantageous embodiment of the invention, there are three multipolar magnets. This term refers to magnets made from several parts, here cylinder segments, which alternate their polarities. One end of such a magnet therefore has a given alternation of south and north poles, with a given angular orientation. This arrangement is known per se from EP-A-1 601 848.

Thus, the keys 9; 90 of two different embodiments of the invention are cylindrically shaped, with identical ends 10; 100 and 11; 110. They differ by their central parts, also called the main body.

The main body 14 of the key 9 is formed of two coaxial sleeves 15, 16. The sleeve 15 has a zone 150 of greater external diameter than that of the other part 151 constituting the sleeve 15. The zone 150 thus forms a gripping ring of the sleeve 15. By means of translational movement in accordance with the double arrow F, the zone 150 enables the end 11 to be brought into or out of the sleeve 15, more particularly in part 151. During periods when the key 9 is not used, protection of the end relief 11 and, more specifically, of its top 12 is therefore provided. This is because the flat top 12 must be protected against any impact and/or deformation in order to guarantee the integrity of the magnets housed in the end 11 and to enable the lug 8 to be secured with the lug 13. To allow the passage of magnetic radiation emitted or received by the magnets inserted into the relief 11, it is conceivable that the top 12 will be thin, which, de facto, reduces its mechanical resistance to impacts and deformation. In an embodiment that is not shown, a protective cap, for example screwable or clip-on, is provided to protect the relief 11 or 110.

The sleeve 16, the outer diameter of which is similar to the outer diameter of the part 150, ensures that the key 9 is engaged and able to operate during the tightening or loosening of the screw 1.

The key 90 comprises a main body 17 comprising an outer sleeve 170. The sleeve 170 receives an inner, coaxial sleeve 171 with the end relief 110. The sleeve 171 is screwed, or alternatively slides, into the sleeve 170. This ensures, by means of a helical movement or translation in a direction parallel to the longitudinal axis A90 of the key 90, that the sleeve 171 enters and exits the end relief 110.

Figure 3:
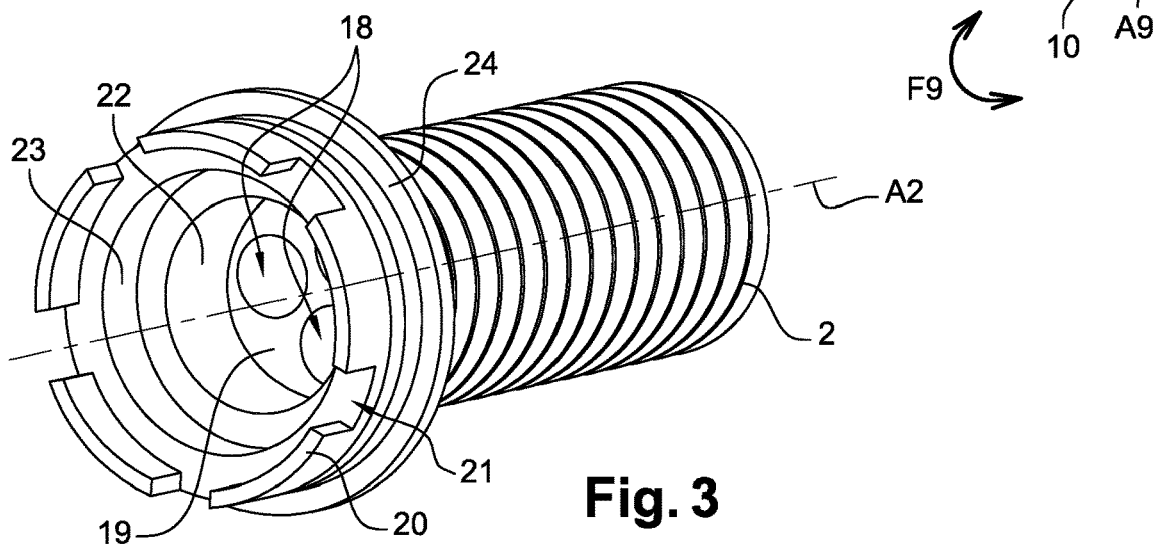
FIG. 3 is a perspective view, on the same scale, of the body of the screw in FIG. 1, without the head.

FIG. 3 shows the body 2 of the screw only, without the head 3.

The non-threaded end 4 of the body 2 is cylindrically shaped, with a circular base and open. The end 4 comprises at least one, advantageously three, housing elements 18 in the form of circular cylindrical wells. The wells 18 are suited to receive translationally movable pistons in a direction parallel to the longitudinal axis A2 of the body 2. For more legibility, the pistons are not shown in FIG. 3. The housing elements 18, with the pistons and the end 4, define a stator.

The access openings of the housing 18 are coplanar with the bottom 19 of the end 4. The bottom 19 is flat and circular.

The cylindrical outer wall 20 of the end 4 has at least one, advantageously five, rectangular notches 21 formed at the free upper edge of the wall 20. The notches 21 are evenly distributed on the wall 20.

The interior volume of the end 4 is defined by two coaxial cylinders and of different diameters. The smaller-diameter part 22 extends from the bottom 19 to about half the height of the wall 20.

The part 23 is the terminal part of the end 4 and extends the part 22 outwards. Thus, the larger-diameter part 23 defines the access to the volume of the end 4, and therefore to the stator as defined above.

An annular groove 24 is formed on the outer face of the wall 20, specifically at the junction zone between the parts 22 and 23.

The end 4 forms a housing element with an access opening of diameter greater than that of the bottom of the housing. The end 4 is adapted to receive a part 25 with a matching shape called rotor.

This rotor 25 is shown in FIGS. 5 and 6. It comprises a cylindrical part with a circular base 26 whose outer diameter is smaller than the internal diameter of the part 22, so that the part 26, once inserted into the part 22, is maintained therein while also being freely rotatable. The part 26 has at least one, advantageously three, wells 27.

The wells 27 are cylindrical with a circular base and each with a longitudinal groove 28. The wells 27 are adapted to receive magnets, which may or may not be multipolar, with a given angular position, not shown and known per se. Each magnet is rotationally fixed in its well 27 by a relief formed on the magnet and inserted into the groove 28.

The rotor 25 comprises a second part 29, also cylindrical with a circular base.

The bottom 7 of the part 29 is common with the closed end of the part 26 and thus defines the bottom of the wells 27. The bottom 7 is visible when the rotor 25 is in place in the end 4 and the head 3 caps the rotor 25. Thus, the bottom 7 of the part 29 of the rotor 25 forms a visible flat interface between the outside and the magnets of the rotor, as shown in FIG. 1.

The outer face of the wall 30 of the part 29 features a helical incline 31. The incline 31 comprises the stops 32, at the top and bottom dead centers.

FIG. 4 shows the head 3 only, according to two angles of view. The head 3 is in the form of a cylindrical cap with a circular base, fully open at one end and with an opening 6 formed on the opposite face 5 of the head 3. The inner face 33 of the head 3 has at least one, advantageously five, longitudinal grooves 34, here on the rectangular cross-section, running parallel to the longitudinal axis A3 of the head 3. An annular groove 35 is formed on the face 33 of the head 3 and located at one end of the grooves 34, in the vicinity of the bottom of the head 3, therefore of the face 5. Another annular groove 36 is formed on the inner face 33. This groove 36 is parallel to the groove 35 and intended to, partially, receive a connecting ring or clips when this ring or these clips is/are inserted, also partially, into the annular groove 24 of the wall 20 of the end 4 of the body when the head 3 is in position on the body 2. Disassembly of the head 3 is therefore prevented, while its rotation in relation to the body 2 is authorized.

Figure 7:
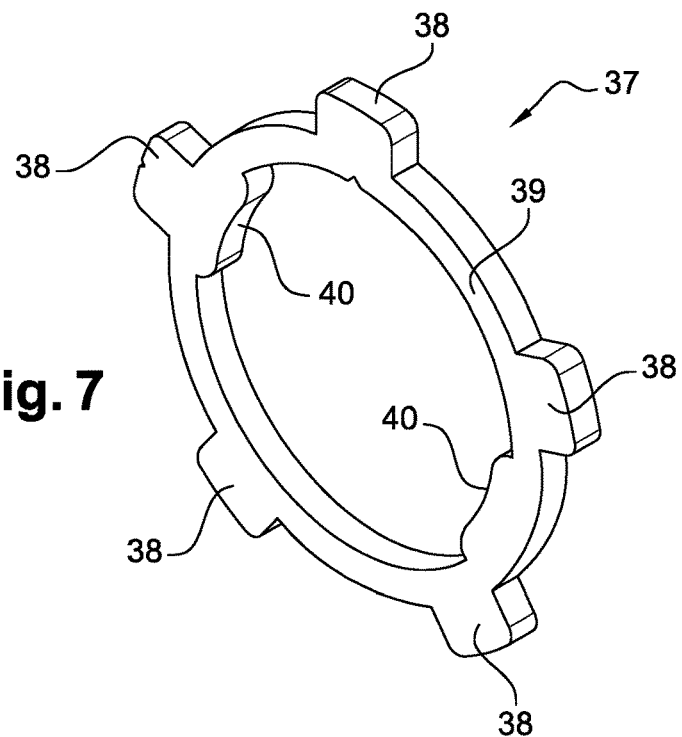
FIG. 7 is a larger-scale perspective view, on a larger scale, of the securing component.

FIG. 7 shows an embodiment of a rotating securing component 37 of the rotor 25 with the head 3. The component 37 is configured as a flat ring. At least one, advantageously five, in this place rectangular, tabs 38 extend outwards from the solid part 39 of the ring 37. The tabs 38 are coplanar with the solid part 39. Two reliefs 40, also coplanar with the solid part 39, extend therefrom towards the central aperture of the ring 37. The tabs 38 match the shape and dimensions of those of the grooves 34.

FIGS. 11 to 17 show the various positions of the constituent elements of a screw 1 and the operation of the screw with a key according to one embodiment of the invention.

Figure 11:
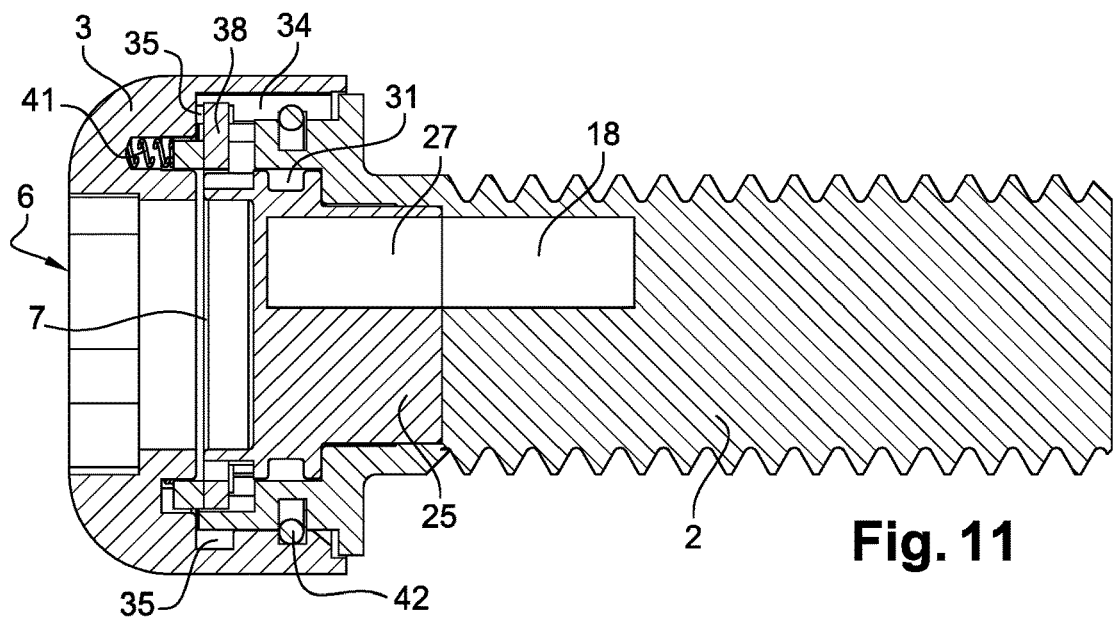
FIGS. 11 and 12 are cross-sectional views of the screw, respectively along longitudinal section lines that are different from FIG. 1 when the head is in the loose rotating position.
Figure 12:
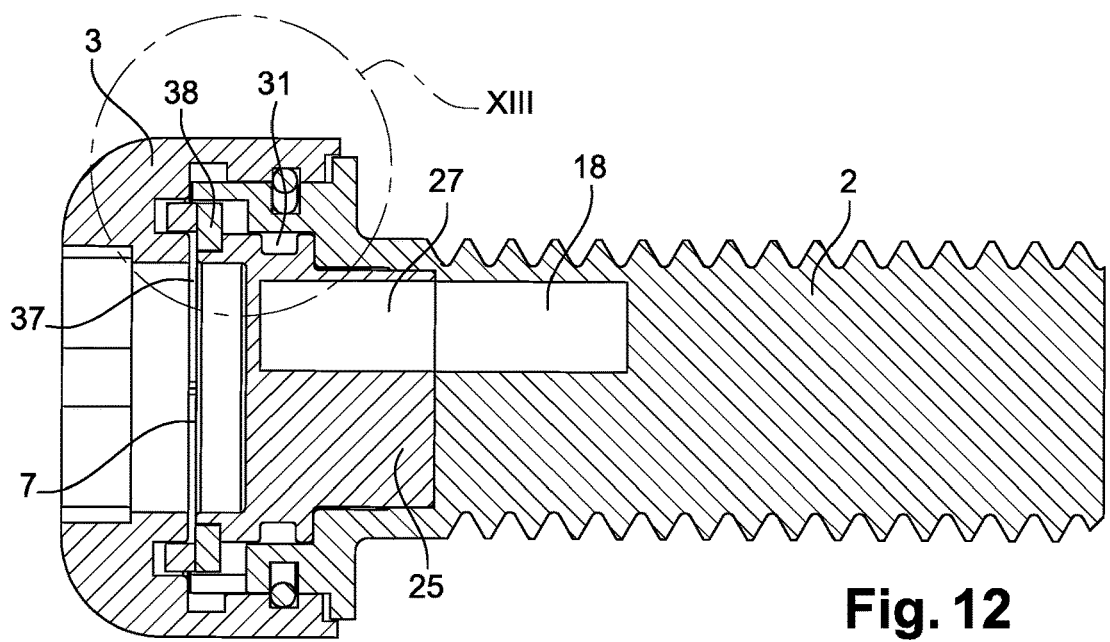
Figure 13:
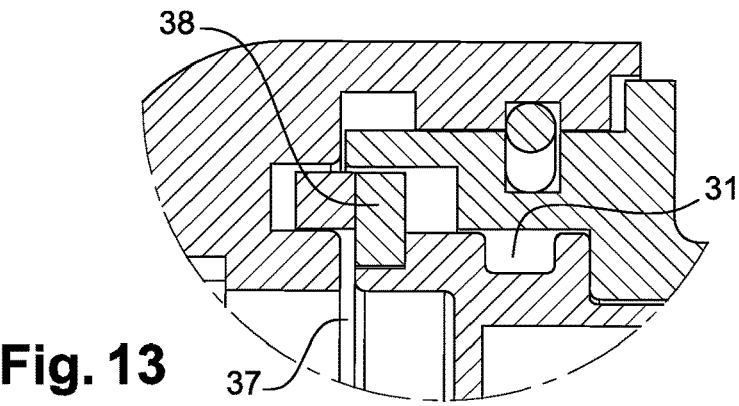
FIG. 13 is a partial cross-sectional view, on a larger scale, of detail XIII in FIG. 12, FIGS. 14 and 15 are similar views and on the same scale, respectively, in FIGS. 12 and 13, when the head is in a locked rotating position, with FIG. 15 being an enlarged view of detail XV in FIG. 14.

FIGS. 11 and 12 show the screw 1 as a cross-section along two longitudinal sectional planes forming between them an angle in the vicinity of 120°, in a configuration where the head 3 is said to be rotationally loose.

In this configuration, the head 3, mounted on the body 2, is freely rotating around the aligned longitudinal axes A2 and A3, while the body 2 is rotationally fixed. The rotor 25 is rotationally integral with the body 2, more particularly with the end 4. Thus, the inner face 33 of the head 3 is not rotationally integral with the wall 20 of the end 4 of the body 2 while also being connected thereto. In other words, the head 3 is rotationally loose but is integral with the body 2 and cannot be detached therefrom.

This configuration is obtained by mounting the ring 37 between the head 3 and the rotor 25. The ring 37 is mounted around the helical incline 31 of the rotor 25, the latter being positioned in the end 4, with the part 26 of the rotor 25 having the magnets opposite the wells 18, in the part 22 of the end 4.

The rotor 25 is held in position in the end 4. A seal, not shown, is inserted into an annular groove 42, visible in FIG. 6, and positioned on the outer face of the part 29.

When the ring 37 is on the helical incline 31, the tabs 38 extend outwards from the end 4 through the notches 21. The translational movement generated by the helical incline 31 of the rotor 35 is limited by the stops 32 of the rotor 25 when in contact with the reliefs 40 of the ring 37. The movement of the ring 37 is limited by the rotation of the rotor 25, rotation limited to about a quarter of a turn by the contact between the reliefs 40 of the ring 37 on the stops 32 of the incline 31. The tabs 38 inserted into the notches 21 ensure that the ring 37 and the end 4 of the body 2 are rotationally integral. In other words, the ring 37 provides a link between the head 3 and the body 2.

When the ring 37 is in an upper position on the incline 31, it is positioned at the bottom of the head 3, at the level of the groove 35. In this case, the tabs 38 have been displaced translationally in a guided manner in the notches 21 and the grooves 34 of the head 3. Since the grooves 34 open onto the groove 35, the tabs 38 are de facto inserted into the groove 35 at the end of the movement. It can be seen that this translational movement of the ring 37 results from rotational movement of the rotor 25.

When initiating a rotational movement of the head 3, irrespective of the direction of rotation and/or the range of movement, the grooves 34 are shifted in relation to the tabs 38 of the ring 37, which remains rotationally fixed. As the tabs 38 are no longer engaged with the grooves 34, the head 3 is rotationally disengaged from the end 4 of the body 2 of the screw 1.

The tabs 38 in position in the groove 35 enable the head 3 to rotate freely in relation to the body 2 of the screw 1. Insofar as the opening 6 formed in the head 3 enables the screw 1 to be tightened or loosened, it is not possible to perform these operations: only the head 3, and not the rest of the screw 1, is set into rotation. This so-called loose configuration is therefore a secure configuration, no change is possible to the position of the screw 1, whether tightened or not.

Maintaining the ring 37 in position in the groove 35 is optimized by the springs 41 occupying the bottom of the head 3 in one direction of thrust, and by the rotor 25 itself in the opposite direction of thrust.

This is because in this configuration, the springs, not shown, inserted into the wells 18 push the pistons towards the rotor 25. Under the action of the springs, the ends of the pistons, are partially inserted into the housing elements 27 of the rotor 25 receiving the magnets.

In this configuration, the rotor 25 is rotationally locked by the pistons in relation to the rest of the body 2. In this position, while the ring 37 is in the position in the groove 35, only the head 3 can rotate freely around the aligned axes A2, A3.

This configuration, also called disengaged, also corresponds to a so-called coding configuration of the magnets in the rotor 25. This is because the magnets are rotationally and translationally fixed.

To move from this position to a so-called engaged position, in which the head 3 is rotationally integral with the body 2, it is necessary to operate the rotor 25 with a key 9 or 90.

Figure 16:
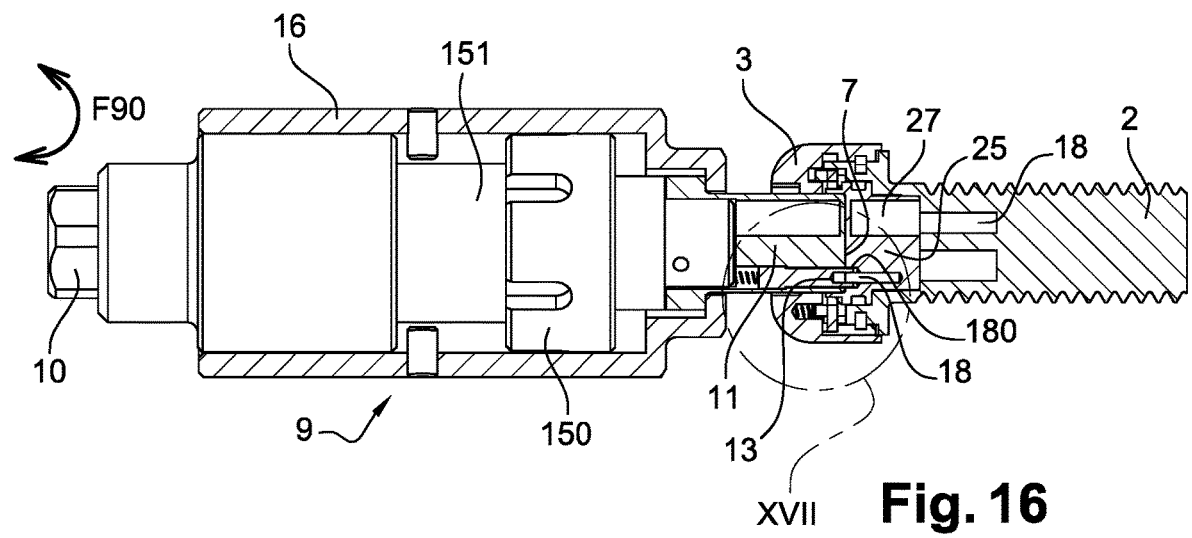
FIG. 16 is a cross-sectional view, on a different scale, of the key in FIG. 9 in a position on the head of the screw in FIG. 1, in a rotationally locked position
Figure 17:
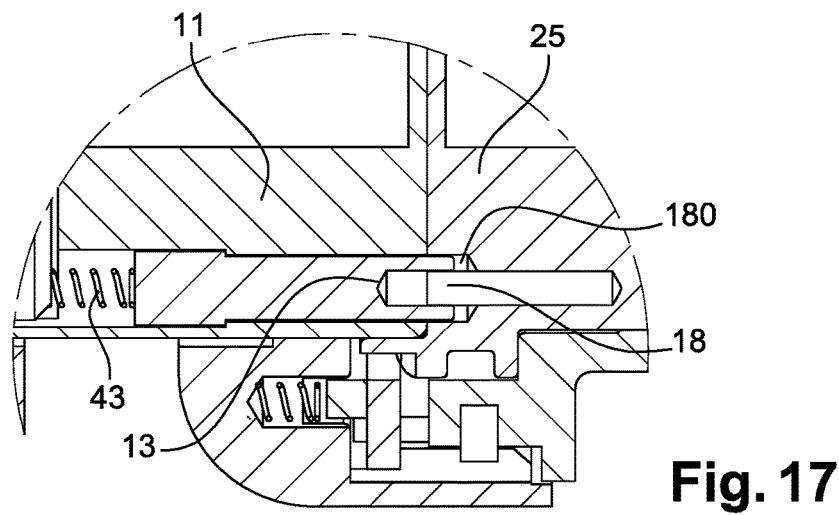
FIG. 17 is a partial cross-sectional view, on a larger scale, of detail XVII.

FIGS. 16 and 17 show this operation using a key 90, it being understood that the operation is identical using a key 9. The end 120 is inserted through the opening 6 and positioned so that the lugs 13 and 8 are in contact. In this way, the magnets of the rotor 25 are aligned with those of the relief 120. In other words, the positioning is guided, the lugs 13 and 8 acting as locating pins.

As is apparent from FIG. 17, a spring 43 pushes the lug 13 onto the lug 8, thus securing the positioning of the relief 120 on the bottom 7 of the rotor 25. In this alignment configuration of the magnets of the rotor 25 and the key 90, the polarities of the same sign, north or south, of the magnets of the relief 120 and the rotor 25 are opposite each other.

Since the magnets of the rotor 25 are translationally movable in the housing elements 27, with this translation being guided by the grooves 28 which prevent the magnets from rotating, the magnets of the rotor 25 move towards the stator, namely towards the wells 18 of the end 4. In this way, the pistons are pushed back to the bottom of the wells 18.

The pistons are no longer partially inserted into the housing elements 27 and thus no longer rotationally lock the rotor 25.

It is then possible, with a movement of the key 90, to set the rotor 25 into rotation, as per the double arrow F90. This rotational movement is possible due to the link between the lugs 13 and 8. The rotational movement of the rotor 25 translates the ring 37 on the helical incline 31. Translation is only possible when the tabs 38 of the ring 37 are opposite to the grooves 34 of the head.

Figure 14:
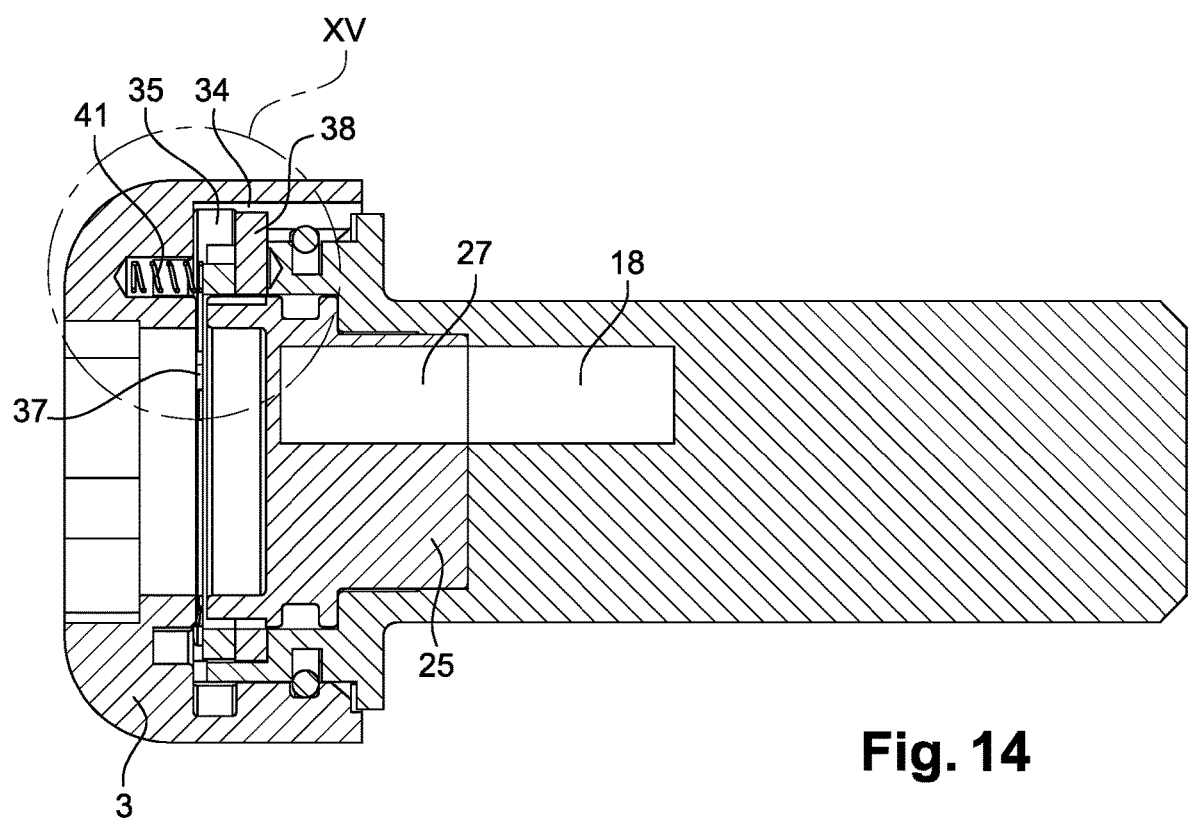
Figure 15:
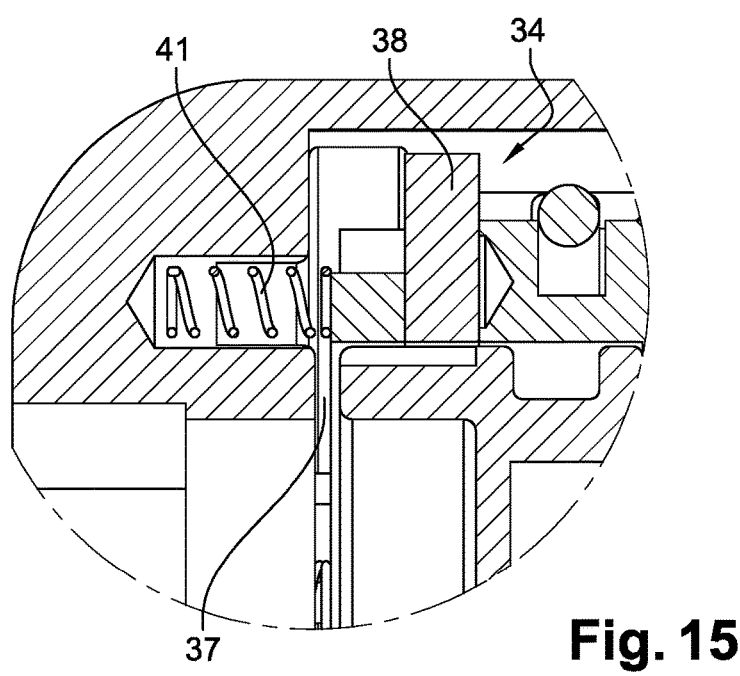

As shown in FIGS. 14 and 15, when the tabs 38 are engaged in the grooves 34, the head 3 is rotationally integral with the ring 37. By locking the reliefs 40 on the stops 32 in the lower position on the incline 31, this ring 37 is rotationally integral with the stator, therefore with the end 4 of the body 2.

In other words, the ring-shaped securing component 37 provides a link between the stator, formed by the end 4 and the pistons, and the head 3, with these elements being fixed in relation to each other. The user can then tighten or loosen the screw 1 with the relief 10 or 100 of the key 9 or 90.

The presence of a flat bottom 7, without any opening or joining plane prevents any fraudulent forcing of the rotor 25. In other words, since magnets with different polarities are present, only a given key enables the rotor 25, and therefore the screw 1, to be operated, it being understood that this key cannot be copied if the arrangement of the magnet(s) of the rotor 25 is not known.

This assembly has applications in, for example, securing the closure of an access cover for elements controlling and/or operating machine tools, automatic barriers, access points, parking meters, traffic lights, street lamps, vending machines for products or services, mailboxes, and security boxes, electrical cabinets or otherwise.

In other embodiments, a key enables several screws with the same magnetic coding to be operated.

Alternatively, a key can receive the reliefs 11; 110, whether removable or not, enabling the operation of several screws or sets of screws with different codings.

In another embodiment, the key has more than one relief receiving magnets: for example, a set of reliefs each fitted with magnets coding for a given screw series.

Alternatively, the screw is operated by a known tool, with the head opening configured to match a standardized geometric shape.

In another embodiment, the head opening is configured to receive only the relief fitted with the magnets. The screw is tightened or loosened by a key engaged with the outside of the head, which, for example, has an external pentagonal shape.

In another embodiment not shown, the relief operating the head of the screw is hollow and its inner volume receives the relief fitted with the magnets. The latter is translationally movable: for example, by sliding in the first relief. Thus, we go from a configuration where, once the relief with the magnets has been released, it is only possible to set the rotor into rotation in a configuration where, once inserted into the operating relief of the head, the screw can be set into rotation. In other words, in this embodiment, one relief serves as a protective sleeve for the other.

The invention claimed is:

1. A safety screw assembly (1) and operating key (9; 90) thereof, comprising:
   a screw (1) formed of a body (2) and a head (3), the head (3) being movable between a first position where it is rotationally integral with the body (2) and a second position where it is freely rotatable, the head (3) having, on one face (5), an opening (6) or a relief, the shape of which matches a relief (10; 100) or an imprint formed on part of said operating key (9; 90), wherein one end (4) of the body (2) of the screw (1) comprises a first part (4, 18, 20, 21, 22, 23) called the stator, and a second rotationally movable part (25), called the rotor, with the head (3) of the screw (1) defining a housing element for receiving the rotor (25), and in that the assembly comprises a translationally movable securing component (37), said component (37) being movable between a first securing position, called the loose position, in which the head (3) is freely rotatable and the rotor (25) and the stator (18, 20, 21, 22, 23) are rotationally integral, and a second position, called the locked position, in which at least the head (3) and the stator (4, 18, 20, 21, 22, 23) are rotationally integral, and in that the key (9; 90) has at least one component (11; 110) for setting the rotor (25) into rotation, wherein the stator (4, 18, 20, 21, 23) comprises two cylindrical parts with a circular base (22, 23), a smaller-diameter part (22) having a bottom (19) with at least two wells (18) forming housing elements receiving translationally movable pistons in a direction parallel to the longitudinal axis (A2) of the body (2).

2. The safety screw assembly according to claim 1, wherein the rotor (25) comprises two parts (26, 29) whose shape matches the parts (22, 23) of the stator, with the smaller-diameter part (26) comprising at least two wells (27) forming housing elements receiving magnets housed in the rotor (25).

3. The safety screw assembly according to claim 2, wherein the wall (30) of the larger-diameter part (29) of the rotor (25) has a helical incline (31) terminated by two stops (32).

4. The safety screw assembly according to claim 1, wherein the securing component (37) is a flat ring fitted with at least one tab (38) extending outwards and coplanar with the solid part (39) of the ring (37).

5. The safety screw assembly according to claim 4, wherein the securing component (37) is said flat ring fitted with five tabs (38) extending outwards and coplanar with the solid part (39) of the ring (37).

6. The safety screw assembly according to claim 4, wherein the ring (37) comprises two reliefs (40) extending towards the inner aperture of the ring (37), coplanar with the solid part (39) of the ring and adapted to operate in conjunction with the stops (32) of the incline (31) when the ring is in position on the larger-diameter part (29) of the rotor (25).

7. The safety screw assembly according to claim 4, wherein the inner face (33) of the head (3) has an annular groove (35) adapted to receive the tab(s) (38) of the ring (37) when the head (3) is in a freely rotating configuration.

8. The safety screw assembly according to claim 7, wherein the inner face (33) of the head (3) has at least one longitudinal groove (34), one end of which opens onto the annular groove (35), and is suited to receive at least one tab (38) of the ring (37) when the head (3) is rotationally integral with the body (2).

9. The safety screw assembly according to claim 8, wherein the inner face (33) of the head (3) has five longitudinal grooves (34), one end of which opens onto the annular groove (35), and is suited to receive five tabs (38) of the ring (37) when the head (3) is rotationally integral with the rotor (25).

10. The safety screw assembly according to claim 1, wherein the operating key (9; 90) comprises said component (11; 110), of which there is at least one, for setting the rotor (25) into rotation, fitted with at least one magnet whose polarity is complementary to said magnet (27), of which there is at least one, housed in the rotor (25).

\* \* \* \* \*